United States Patent [19]

Jumel et al.

[11] Patent Number: 5,049,111
[45] Date of Patent: Sep. 17, 1991

[54] TORSION DAMPING DEVICE HAVING TWO COAXIAL PARTS MOUNTED FOR RELATIVE ANGULAR DISPLACEMENT AND INCORPORATING A VISCOUS DAMPING DEVICE AND A FRICTION DAMPING DEVICE

[75] Inventors: Bernard Jumel, Paris; Hervé Focqueur, Franconville, both of France

[73] Assignee: Valeo, Paris, France

[21] Appl. No.: 397,255

[22] Filed: Aug. 23, 1989

[30] Foreign Application Priority Data

Aug. 30, 1988 [FR] France .................... 88 11359

[51] Int. Cl.⁵ .................... F16D 3/12; F16F 15/12; F16F 15/16
[52] U.S. Cl. .................... 464/24; 192/106.2; 464/68
[58] Field of Search ............... 192/58 B, 106.1, 106.2; 464/24, 27, 68

[56] References Cited

U.S. PATENT DOCUMENTS

| | | | |
|---|---|---|---|
| 3,223,214 | 12/1965 | Kuivinen | 464/68 X |
| 3,534,841 | 10/1970 | Schneider et al. | 464/68 X |
| 4,270,645 | 6/1981 | Beccaris | 192/106.2 X |
| 4,351,167 | 9/1982 | Hanke et al. | 464/24 |
| 4,433,770 | 2/1984 | Loizeau et al. | 464/68 X |
| 4,565,273 | 1/1986 | Tojima et al. | 192/106.2 |
| 4,669,592 | 6/1987 | Alas et al. | 192/106.2 |
| 4,679,679 | 7/1987 | Lech, Jr. et al. | 464/68 X |
| 4,775,042 | 10/1988 | Kohno et al. | 464/24 X |
| 4,777,843 | 10/1988 | Bopp | 192/106.2 X |
| 4,828,533 | 5/1989 | Focqueur et al. | 464/24 |
| 4,856,636 | 8/1989 | Meinhard | 464/68 X |
| 4,874,074 | 10/1989 | Damon et al. | 464/24 X |

FOREIGN PATENT DOCUMENTS

| | | | |
|---|---|---|---|
| 3329420 | 2/1985 | Fed. Rep. of Germany | 464/24 |
| 1501465 | 11/1966 | France . | |
| 2256348 | 7/1975 | France . | |
| 2494795 | 4/1986 | France . | |
| 2576985 | 8/1986 | France . | |
| 2581143 | 10/1986 | France . | |
| 1385304 | 2/1975 | United Kingdom | 464/68 |
| 2089472 | 6/1982 | United Kingdom | 464/68 |
| 2197050 | 5/1988 | United Kingdom . | |

*Primary Examiner*—Daniel P. Stodola
*Attorney, Agent, or Firm*—Charles A. Brown

[57] ABSTRACT

A torsion damper has a viscous damping device, a dry friction damping device, two guide rings, a damper plate and a hub. The viscous damping device is arranged outside the zone which is bounded by the guide rings, and is confined within a housing comprising two housing portions which are movable with respect to each other. Mutual engagement structure which couples components together for simultaneous rotation, are provided between (a) the hub and one of the housing portions and (b) the other portion of the housing and that one of the coaxial parts of the damper which is not coupled with the hub for rotation therewith.

1 Claim, 2 Drawing Sheets

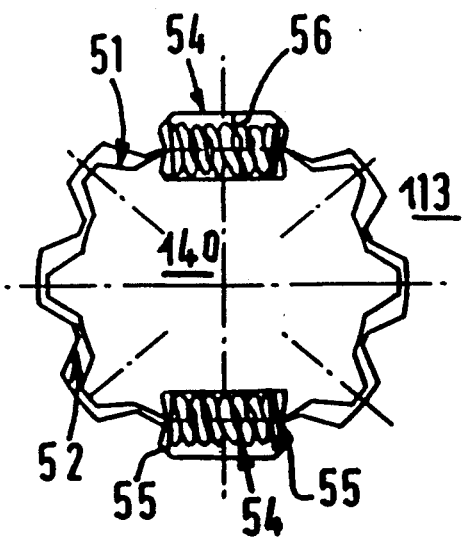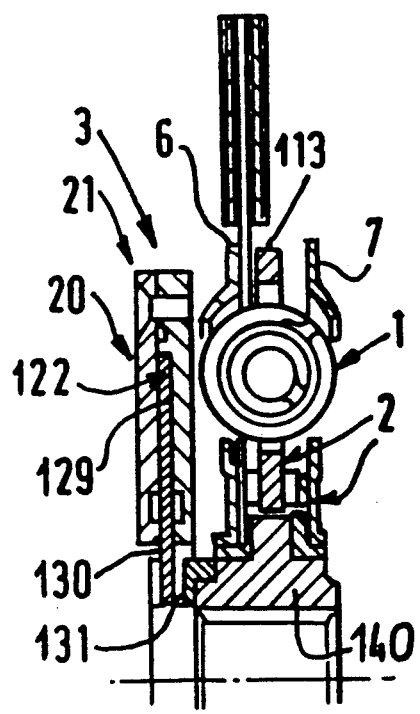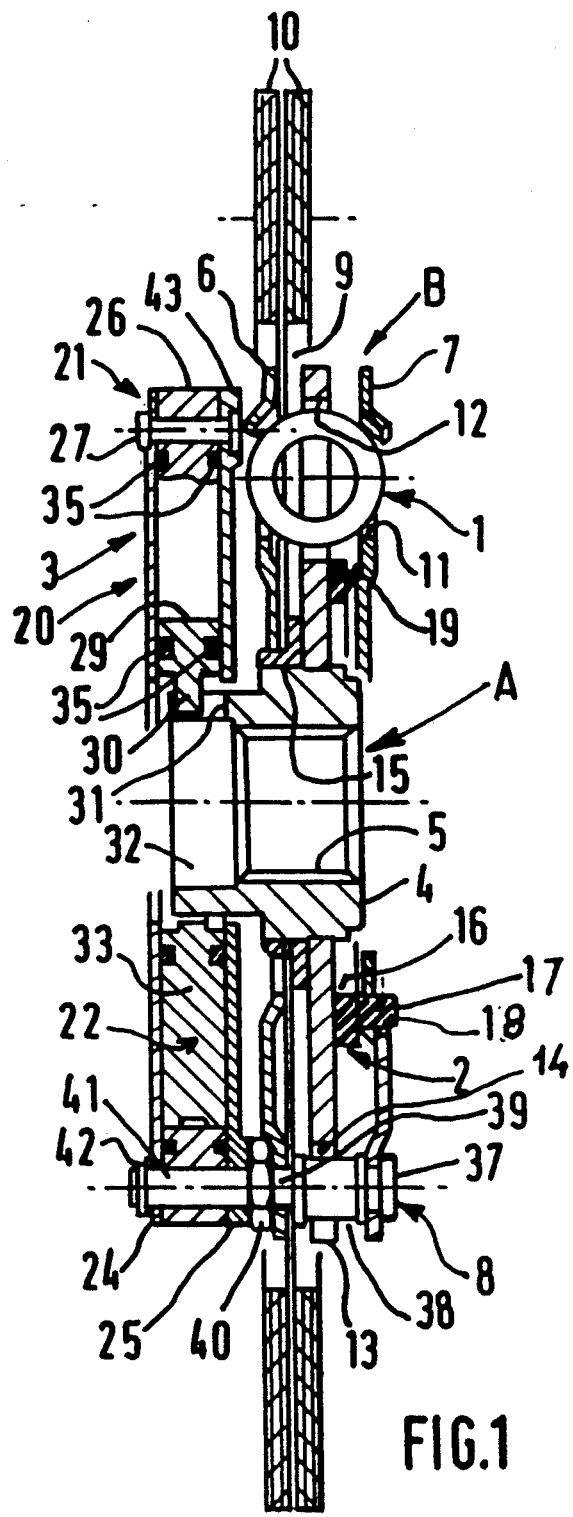

TORSION DAMPING DEVICE HAVING TWO COAXIAL PARTS MOUNTED FOR RELATIVE ANGULAR DISPLACEMENT AND INCORPORATING A VISCOUS DAMPING DEVICE AND A FRICTION DAMPING DEVICE

FIELD OF THE INVENTION

This invention relates to torsion damping devices, particularly for automobile vehicles, in which the damping device is of the kind comprising two coaxial parts which are mounted so as to be movable with respect to each other, within the limits of a predetermined angular displacement and against the action of resilient means and damping means, the damping means including a viscous damping means.

BACKGROUND OF THE INVENTION

A device of the kind defined above is described in the published French Patent Application No. FR 2 606 104A and the corresponding United Kingdom Specification GB 3 197 050. An arrangement of this kind has certain disadvantages, namely the absence of specific damping means of the friction ring type, and the need for special manufacturing methods for the damper components, especially the guide rings and the damper plate. In addition, the radial size of the viscous damping means is somewhat constrained.

SUMMARY OF THE INVENTION

An object of the present invention is to overcome these disadvantages, and therefore to provide a torsion damper with a viscous damping means assembled from standard components capable of various applications, together with damping means of the dry friction ring type, while also producing other advantages.

According to the invention, a damper of the kind defined above, in which one of the coaxial parts includes two guide rings disposed on either side of a damper plate which is a component of the other coaxial parts, with the damper plate or the guide rings being coupled with a hub in such a way that, after a clearance has been taken up, the damper plate or guide rings will rotate with the hub, is characterised in that the viscous damping means is disposed outside the zone bounded by the guide rings; the viscous damping means is confined within a housing having two housing portions which are movable with respect to each other; and mutual engagement means, i.e. means for coupling components together for simultaneous rotation, are provided (a) between the hub and one of the housing portions and (b) between the other housing portion and that part of the damper which is not coupled with the hub for simultaneous rotation therewith.

The invention enables the viscous damping means to be assembled as a "cassette" which can be added to a torsion damper constructed from standard components. In addition, the viscous damping means is able to extend radially by an increased amount, and can thus be made more efficient. Moreover, the housing can be arranged to extend radially outwardly beyond the resilient means of the damper.

The description which follows illustrates the invention, by way of example only, with reference to the accompanying drawings.

BRIEF DESCRIPTION OF THE DRAWINGS

FIG. 1 is a view in axial cross section of a torsion damper according to the invention, taken on the line I—I in FIG. 2.

FIG. 3 is a half view similar to FIG. 1, but shows another embodiment.

FIG. 4 is a simplified view of the loose coupling means used in the embodiment shown in FIG. 3.

DESCRIPTION OF PREFERRED EMBODIMENTS

Figure 2:
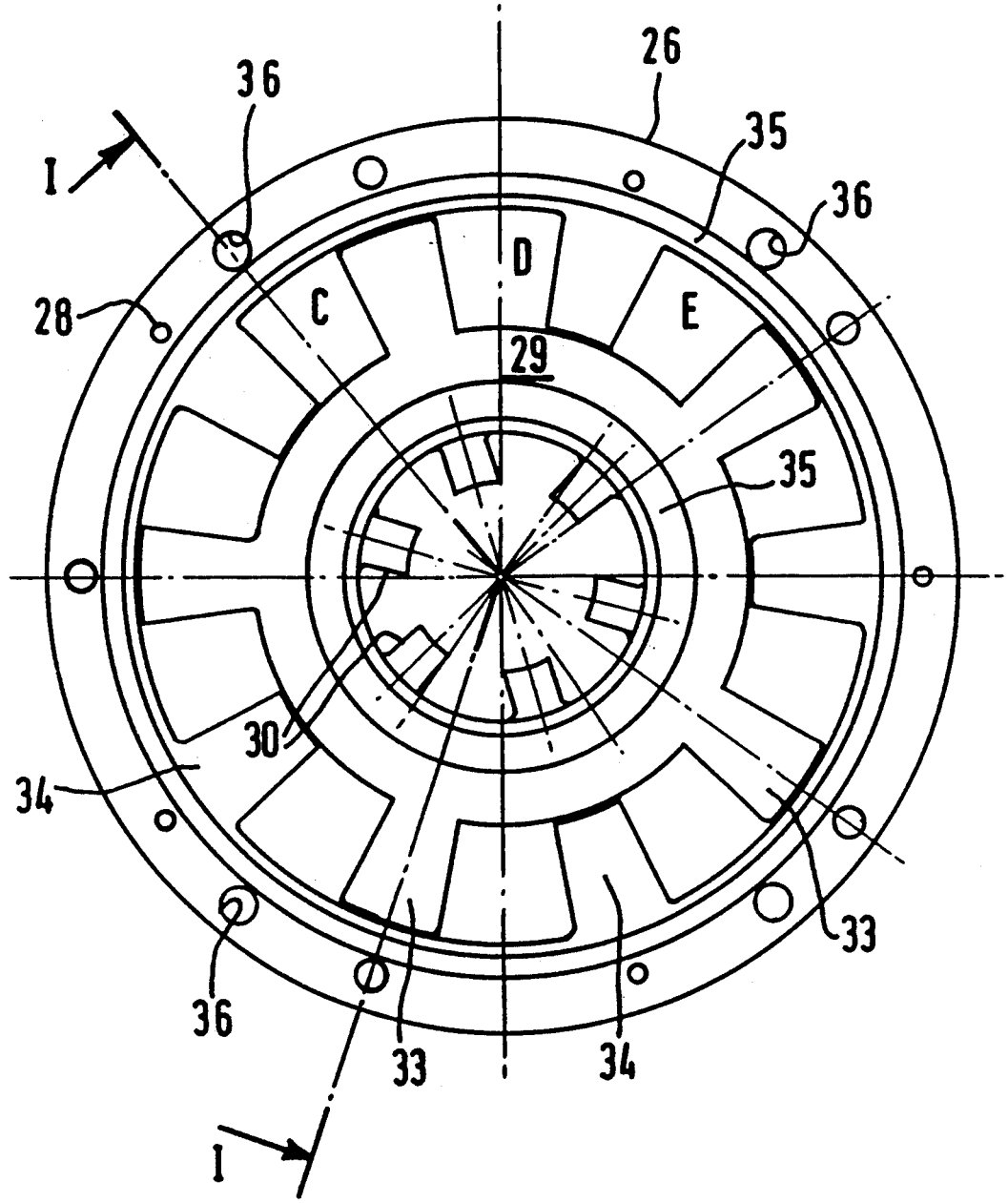
FIG. 2 is a front view of the viscous damping means, with one of its damper plates shown in heavy lines.

In the various embodiments to be described, the torsion damper is a friction clutch for an automobile vehicle. This clutch includes two coaxial parts A and B, mounted so as to be movable with respect to each other within the limits of a predetermined angular displacement and against the action of resilient means 1. The clutch also includes dry friction damping means 2 and viscous damping means 3. The coaxial part A comprises a hub 4, the internal bore 5 of which is splined so as to couple the hub rotatably with the input shaft of the gearbox. The coaxial part B comprises two guide rings 6 and 7. In FIG. 1, the guide rings 6 and 7 are connected to each other, and spaced from each other, by means of spacer bars 8 which are to be described later herein. The guide rings 6 and 7 are freely mounted around the tub 4. The guide ring 6 carries a clutch disc 9 which is provided with friction pads 10, the said disc 9 being coupled with the guide rings 6 and 7 by means of the spacer bars 8. The friction pads 10 couple the guide rings 6 and 7 with the crankshaft of the engine, for rotation therewith when the clutch is engaged, the pads 10 then being gripped between a pressure plate and a reaction plate (not shown).

The guide rings 6 and 7 are provided with through openings 11 in which resilient means 1 are accommodated. These resilient means are, in this example, in the form of coil springs. The springs 1 are also mounted in another set of through openings 12, which are formed in a damper plate 13 welded to the hub 4, the openings 12 being located facing towards the openings 11. The damper plate 13 is disposed axially between the guide rings 6 and 7, and is provided with slots 14 through which the spacers 8 pass.

A centring bearing 15, of L-shaped cross section, is inserted so as to lie axially between the damper plate 13 on one side, and the disc 9 and guide ring 6 on the other side, and radially between the outer periphery of the hub 4 and the inner periphery of the guide ring 6. The bearing 15 is coupled with the guide ring 6, for rotation therewith, by a suitably formed coupling means.

A friction ring 16 is inserted axially between the damper plate 13 and the other guide ring 7. This friction ring is preferably made of plastics material, and is provided with pins 17 which are engaged in corresponding openings 18 formed in the guide ring 7, so as to couple the rings 16 and 7 together in simultaneous rotation. A resilient ring 19, which in this example is a Belleville ring, bears upon the guide ring 7 and exerts a biassing force on the friction ring 16 in a direction towards the damper plate 13. These arrangments together constitute the dry friction damping means 2 which acts between the damper plate 13 and the guide rings 6 and 7.

In accordance with the invention, the viscous damping means 3 is disposed outside the zone bounded by the guide rings 6 and 7, and is housed within a housing 20 which comprises two portions 21 and 22, movable with respect to each other. Mutual engagement means, i.e. means coupling the components concerned together for simultaneous rotation, are provided between one of the housing portions 21 and 22 and the coaxial part A or B of the damper which is not coupled with the hud for rotation with the hub. Mutual engagement means are also provided between the hub 4 and the other portion (22 or 21) of the housing 20. In this example, the housing 20 is in the form of two face plates 24 and 25, which are maintained at a fixed axial spacing with respect to each other by means of an annular spacing ring 26. Rivets 27 extend through the face plates 24 and 25 and the spacing ring 26, so as to fasten these elements together. FIG. 2 shows the holes 28 inches are formed in the spacing ring 26 for accommodating these rivets 27. The housing 20, and thus the viscous damping means 3, extend radially outwardly beyond the springs 1.

The above components are part of the housing portion 21. The other housing portion, 22, includes an annular, internal carrying element 29, interposed axially between the inner peripheries of the face plates 24 and 25 and having teeth 30, which are spaced regularly in circumferential relationship on its inner periphery. Each of these teeth 30 meshes without a clearance in a complementary slot 31 which is formed in an axial extension 32 of the hub 4. The teeth 30 and slots 31 thus constitute a mutual engagement means for coupling the portion 22 in mutual rotation with the hub 4.

The element 29 is provided with radial fins 33 which are directed outwardly towards the spacing ring 26, while the latter has fins 34 which are directed radially towards the element 29. In this way the spacing ring 26 acts as an outer carrying element. Each of the fins 33 and 34 is trapezoidal in shape, and they form two groups mounted in inverse relationship with each other and extending generally in the radial planes passing through the common axis, with one fin of one group being interposed circumferentially between two fins of the other group.

Sealing joints 35 are provided for hermetically sealing the housing 20. Calibrated passages are formed between consecutive fins 33 and 34, and the housing 20 is partially filled with a fluid such as a silicone. The spacing ring 26 is also provided with holes 36, through which the spacer bars 8 extend. Each spacer bar 8 has a head 37, a portion 38 with a diameter larger than that of the head, for maintaining the axial distance between the two guide rings 6 and 7, a filleted portion 39 of reduced diameter for securing the rings by means of a nut 40, and finally a cylindrical shank 41 which extends through the face plates 24 and 25 and the hole 36. The spacer bar 8 terminates in an end portion having a groove for mounting a circlip 42 bearing against the face plate 24. The housing 20 is in this way coupled with the guide rings 6 and 7 for simultaneous rotation with the guide rings, with which it is coupled axially by trapping the housing 20 between the nuts 40 and the circlips 42. The face plate 25 has a portion 43 of increased thickness which cooperates with the nut 40. In a modification, the free end of the shank 41 may be deformed so that the spacer bar becomes a rivet.

All the above arrangements constitute a mutual engaging means between the viscous damping means 3 and the guide rings 6 and 7.

In operation, relative movement takes place between the guide rings 6 and 7 and the damper plate 13, in such a way that friction is set up in dependence on the load exerted by the Belleville ring 19 between the damper plate 13 and the friction ring 16, and also between the damper plate 13 and the bearing 15. During this movement the springs 1 become compressed, and the fluid is displaced within the housing 20. With reference to FIG. 2, it will be seen that, on either side of each fin 33, a chamber C, D or E is defined. During the above mentioned movement, one of the chambers, D, present between two consecutive fins 33, becomes reduced in size while the chambers C and E become larger.

It will be appreciated that good cooperation between the damping means 2 and 3 is obtained. The viscous damping effect leads to good damping at high relative velocities between the parts of the damper, while the dry friction damping means may be adapted for small speed variations.

It will be clear from this description that the friction clutch according to the invention differs from a conventional friction clutch only in respect of the viscous damping means 3, the hub 4 and the spacer bars 8. This is mainly due to the clamping of the damper plate 13 to the hub 4. In this connection, reference is made for example to French published Patent Application No. FR 2 494 795 A.

In a modification, the hub itself may be standard. To this end all that is necessary is to attach a member provided with slots to the hub as seen in FIG. 3.

This invention is of course not limited to the embodiments described. For example, the viscous damping means may comprise a disc constituting the portion 122 and the internal element 129, provided with teeth for meshing with the hub as seen in FIG. 3. It may also be similar to that described in the above mentioned document FR 2 606 104 A. The damper plate 113, as in FIG. 3, may be made movable with respect to the hub 140 with loose coupling means being provided between the hub and the damper plate as well as the resilient means as described in U.S. Pat. No. 4,669,592 and the corresponding published French Patent Application No. FR 2 560 328 A. In this connection, reference is made to FIG. 4, in which the loose coupling means are indicated at 50, and comprise sets of teeth 51 and 52, formed respectively in the outer periphery of the hub 140 and in the internal periphery of the damper plate 113, the hub teeth 140 extending into the slots in the hub plate 113 and vice versa, with a circumferentially extending clearance in both cases. The resilient means 54, which comprise springs of smaller stiffness than the springs 1, engage at their circumferential ends on the slots 56 which are formed respectively in the damper plate 113 and in the hub 140 with inserts 55 interposed. In this case, the teeth 130 of the element 129 may mesh with a clearance in the slots 131 of the hub 140.

Coupling between the hub 140 and the internal carrying element 129, for rotation of these two members together, may be achieved by means of axial pins, carried by the teeth 130 of the element 129 and engaged in axial holes formed in the hub.

The guide rings may be secured to the hub, while the damper plate may carry the friction disc, being then mounted freely with respect to the hub. In this case, the coupling between the damper plate and the face plates 24 and 25, spaced apart by the spacing ring 26, is achieved by means of spacer bars which also secure the friction disc to the damper plate.

In this case in which securing of the friction disc 9 is separate from the spacer bars 8, it is possible to fix the housing 20 on whichever one of the guide rings 6 and 7 does not carry the disc 9. In this case, when the disc 9 is secured by riveting, and when the guide rings 6 and 7 are identical with each other, it is sufficient to use the free holes in the guide ring, which are provided for the purpose of securing the housing 20 by riveting to the side of the guide ring not carrying the friction disc 9. As will be clear from this description, it is possible to couple the housing portion 21 of FIG. 1 to the hub for mutual rotation, and the housing portion 22 of FIG. 1 to the guide rings 6, 7, or to the damper plate 13 as the case may be, again for rotation together. This may for example be done (with reference to FIG. 3) by providing the housing portion 21 with internal teeth similar to the teeth 30, and by coupling the annular internal carrying element 29 to the guide rings. However, these arrangements will be less satisfactory from the point of view of sealing integrity, since the joints will be subjected to greater forces than in the embodiments described above. In the embodiments shown in FIGS. 1 and 3, the internal joints 35 are only subject to very small forces, due mainly to the fact that the housing 20 is partially filled and the fluid is centrifuged.

In yet another modification, the internal carrying element or disc 29 may be provided with gripping teeth on its internal bore, and be made harder than the hub. It is then force fitted on to a cylindrical outer surface of the hub, so that small grooves are formed on the latter until the internal carrying element (or disc) 29 comes into abutment against a shoulder of the hub. The internal carrying element is thus secured axially to the hub by the free end of the above mentioned hub surface being intimately engaged with the carrying element.

In a further modification, the portion 21 of FIG. 1 may be provided with teeth, similar to the teeth 30 and cooperating with grooves formed in a member which is fixed with respect to the guide rings, or with respect to the damper plate as the case may be. In this case, the housing 20 may also be mounted in a damper having a carrying ring provided with an axial crown portion, which is provided with apertures as described in published French Patent Application No. FR 2 581 143 A, the housing being mounted in place of one of the dampers described in that publication.

What is claimed is:

1. A torsion damping device comprising first and second coaxial parts, mounting means mounting said first and second coaxial parts for angular displacement relative to each other, said mounting means defining a predetermined range of angular displacement for relative movement of said coaxial parts, resilient means engaging said coaxial parts and resisting relative angular movement between said coaxial parts, movement damping means between said coaxial parts resisting said relative movement, said movement damping means including a viscous damping means between said coaxial parts having a fluid and calibrated passages through which said fluid flows in response to said movement and being operable for viscous damping of high speed variations between said coaxial parts and dry friction damping means between said coaxial parts for frictionally damping low speed variations between said coaxial parts, said first coaxial part comprising a damper plate and said second coaxial part comprising two guide rings disposed on opposite sides of said damper plate, said device also including a hub, said mounting means for said coaxial parts including first means mounting said damper plate around said hub and second means mounting said guide rings around said hub, one of said first and second means and said hub together defining a circumferential clearance between said coaxial parts permitting initial limited relative rotation between said coaxial parts to take up said clearance between said coaxial parts followed by rotation of said coaxial parts in unison, said dry friction damping means being arranged between said damper plate and said guide rings and said viscous damping means being disposed outside a zone bounded by said guide rings, said viscous damping means including a housing comprising two housing portions and third means mounting said housing portions for movement with respect to each other, fourth means securing together for relative rotation said hub and one of said housing portions on one hand and the other of said housing portions and that coaxial part that is not coupled for rotation to said hub on an other hand, one of said housing portions having an internal element, mutual engagement means coupling said hub and said internal element together for rotation in unison, said mutual engagement means including teeth on said internal element engaging in slots in said hub, said second means mounting said guide rings freely with respect to said hub, spacer means securing said guide rings to each other and to one of said housing portions, said housing including two face plates and a spacing ring between said face plates to constitute with said face plates said other said housing portions, and said spacer means including a shank extending through said face plates and said spacing ring.

* * * * *